United States Patent
Kachmar

(10) Patent No.: US 8,422,843 B2
(45) Date of Patent: Apr. 16, 2013

(54) MULTI-FIBER FIBER OPTIC CABLE

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 750 days.

(21) Appl. No.: 12/411,756

(22) Filed: Mar. 26, 2009

(65) Prior Publication Data

US 2009/0317038 A1 Dec. 24, 2009

Related U.S. Application Data

(60) Provisional application No. 61/040,164, filed on Mar. 28, 2008.

(51) Int. Cl.
G02B 6/44 (2006.01)

(52) U.S. Cl.
USPC ........... 385/104; 385/100; 385/103; 385/107; 385/113

(58) Field of Classification Search ........... 385/100–114
See application file for complete search history.

(56) References Cited

U.S. PATENT DOCUMENTS

| | | | |
|---|---|---|---|
| 3,991,014 A | 11/1976 | Kleinschuster | |
| 4,067,852 A | 1/1978 | Calundann | |
| 4,083,829 A | 4/1978 | Calundann et al. | |
| 4,130,545 A | 12/1978 | Calundann | |
| 4,161,470 A | 7/1979 | Calundann | |
| 4,318,842 A | 3/1982 | East et al. | |
| 4,468,364 A | 8/1984 | Ide | |
| 4,659,174 A | 4/1987 | Ditscheid et al. | |
| 4,807,962 A | 2/1989 | Arroyo et al. | |
| 4,815,813 A | 3/1989 | Arroyo et al. | |
| 4,818,060 A | 4/1989 | Arroyo | |
| 4,844,575 A | 7/1989 | Kinard et al. | |
| 4,895,427 A | 1/1990 | Kraft | |
| 4,909,592 A | 3/1990 | Arroyo et al. | |
| 4,913,517 A | 4/1990 | Arroyo et al. | |
| 5,015,063 A | 5/1991 | Panuska et al. | |
| 5,125,063 A | 6/1992 | Panuska et al. | |
| 5,146,046 A | 9/1992 | Arroyo et al. | |
| 5,157,752 A * | 10/1992 | Greveling et al. | 385/112 |
| 5,214,730 A | 5/1993 | Nagasawa et al. | |
| 5,229,851 A | 7/1993 | Rahman | |

(Continued)

FOREIGN PATENT DOCUMENTS

| | | |
|---|---|---|
| EP | 1 016 887 A1 | 7/2000 |
| GB | 1 483 845 | 8/1977 |
| GB | 2 096 343 A | 10/1982 |
| GB | 2 296 575 A | 7/1996 |

OTHER PUBLICATIONS

Description of Fiber Optic Cable—LCF Microcable: Plenum, 6 pages (Aug. 2005).

Fiber Optic Cable LCF Microcable: Plenum, *ADC Telecommunications, Inc.*, 4 pages (Aug. 2005).

(Continued)

*Primary Examiner* — Brian Healy
*Assistant Examiner* — Hung Lam
(74) *Attorney, Agent, or Firm* — Merchant & Gould P.C.

(57) ABSTRACT

A multi-fiber cable assembly includes a plurality of optical fibers and at least two fiber grouping members disposed in a reverse double helical configuration about the plurality of optical fibers. An outer jacket surrounds the fiber grouping members and the plurality of optical fibers.

19 Claims, 7 Drawing Sheets

U.S. PATENT DOCUMENTS

| | | | |
|---|---|---|---|
| 5,345,525 | A | 9/1994 | Holman et al. |
| 5,345,526 | A | 9/1994 | Blew |
| 5,384,880 | A | 1/1995 | Keller et al. |
| 5,542,020 | A * | 7/1996 | Horska .................. 385/112 |
| 5,627,932 | A | 5/1997 | Kiel et al. |
| 5,737,470 | A | 4/1998 | Nagano et al. |
| 5,838,864 | A | 11/1998 | Patel et al. |
| 5,978,536 | A | 11/1999 | Brandi et al. |
| 6,014,487 | A | 1/2000 | Field et al. |
| 6,052,502 | A | 4/2000 | Coleman |
| 6,249,628 | B1 | 6/2001 | Rutterman et al. |
| 6,256,438 | B1 | 7/2001 | Gimblet |
| 6,321,012 | B1 | 11/2001 | Shen |
| 6,500,541 | B1 | 12/2002 | Schoeck, Jr. et al. |
| 6,633,709 | B2 | 10/2003 | VanVickle et al. |
| 6,701,047 | B1 | 3/2004 | Rutterman et al. |
| 6,807,347 | B2 | 10/2004 | McAlpine et al. |
| 6,901,191 | B2 | 5/2005 | Hurley et al. |
| 6,937,801 | B2 | 8/2005 | McAlpine et al. |
| 7,113,680 | B2 | 9/2006 | Hurley et al. |
| 7,180,000 | B2 | 2/2007 | Hager et al. |
| 7,349,642 | B2 | 3/2008 | Tatematsu et al. |
| 7,491,778 | B2 | 2/2009 | Flautt et al. |
| 7,787,727 | B2 | 8/2010 | Bringuier et al. |
| 2002/0125036 | A1 * | 9/2002 | Price et al. ............. 174/113 R |
| 2006/0159407 | A1 | 7/2006 | Kachmar |
| 2006/0198585 | A1 * | 9/2006 | Keller et al. ............. 385/107 |
| 2006/0291787 | A1 | 12/2006 | Seddon |
| 2007/0127878 | A1 | 6/2007 | de Montmorillon et al. |
| 2007/0280615 | A1 * | 12/2007 | de Montmorillon et al. . 385/127 |
| 2009/0317039 | A1 | 12/2009 | Blazer et al. |

OTHER PUBLICATIONS

ADC Spec Sheet, Fiber Optic Cable, Ruggedized Simplex and Duplex Cables, ADC®, Oct. 2005, 4 pages.

ADC Spec Sheet, Fiber Optic Cable, Tactical Cables, ADC®, Oct. 2005, 4 pages.

Krone Optical Systems, Inc. Krone Technical Data, FiberOptic Cabling Solutions, Ruggedized High Density Cables, 2 pages, Oct. 23, 2003.

Northern Lights Cable, a prestolite wire company, 6$^{th}$ edition, Ruggedized High Density Cables, 3 pages. Publically known at least as early as least May 26, 2008.

Superior Essex, FTTP Tight Buffered Indoor/Outdoor Drop, Series W7, RoHS, Product Bulletin, OSP Fiber Produtcs, Nov. 2008, 2 pages.

www.adc.com, Ruggedized High Density Cables, 1 page, Publically known at least as early as May 26, 2008.

International Search Report and Written Opinion mailed Jul. 13, 2009.

* cited by examiner

MULTI-FIBER FIBER OPTIC CABLE

CROSS-REFERENCE TO RELATED APPLICATION

This application claims the benefit of U.S. Provisional Patent Application Ser. No. 61/040,164, filed Mar. 28, 2008, which application is hereby incorporated by reference in its entirety.

BACKGROUND

A multiple fiber optic cable typically includes: (1) a plurality of optical fibers (e.g., 12, 24, 48 optical fibers per cable); (2) a buffer layer that surrounds the optical fibers; (3) a strength layer that surrounds the buffer layer; and (4) an outer jacket. Optical fibers function to carry optical signals. A typical optical fiber includes an inner core surrounded by a cladding that is protected by a coating. The buffer layer functions to surround and protect the coated optical fibers. Strength layers add mechanical strength to fiber optic cables to protect the internal optical fibers against stresses applied to the cables during installation and thereafter. Outer jackets also provide protection against chemical damages.

SUMMARY

An aspect of the present disclosure relates to a multi-fiber cable assembly having a plurality of optical fibers and at least two fiber grouping members disposed in a reverse double helical configuration about the plurality of optical fibers. An outer jacket surrounds the fiber grouping member and the plurality of optical fibers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
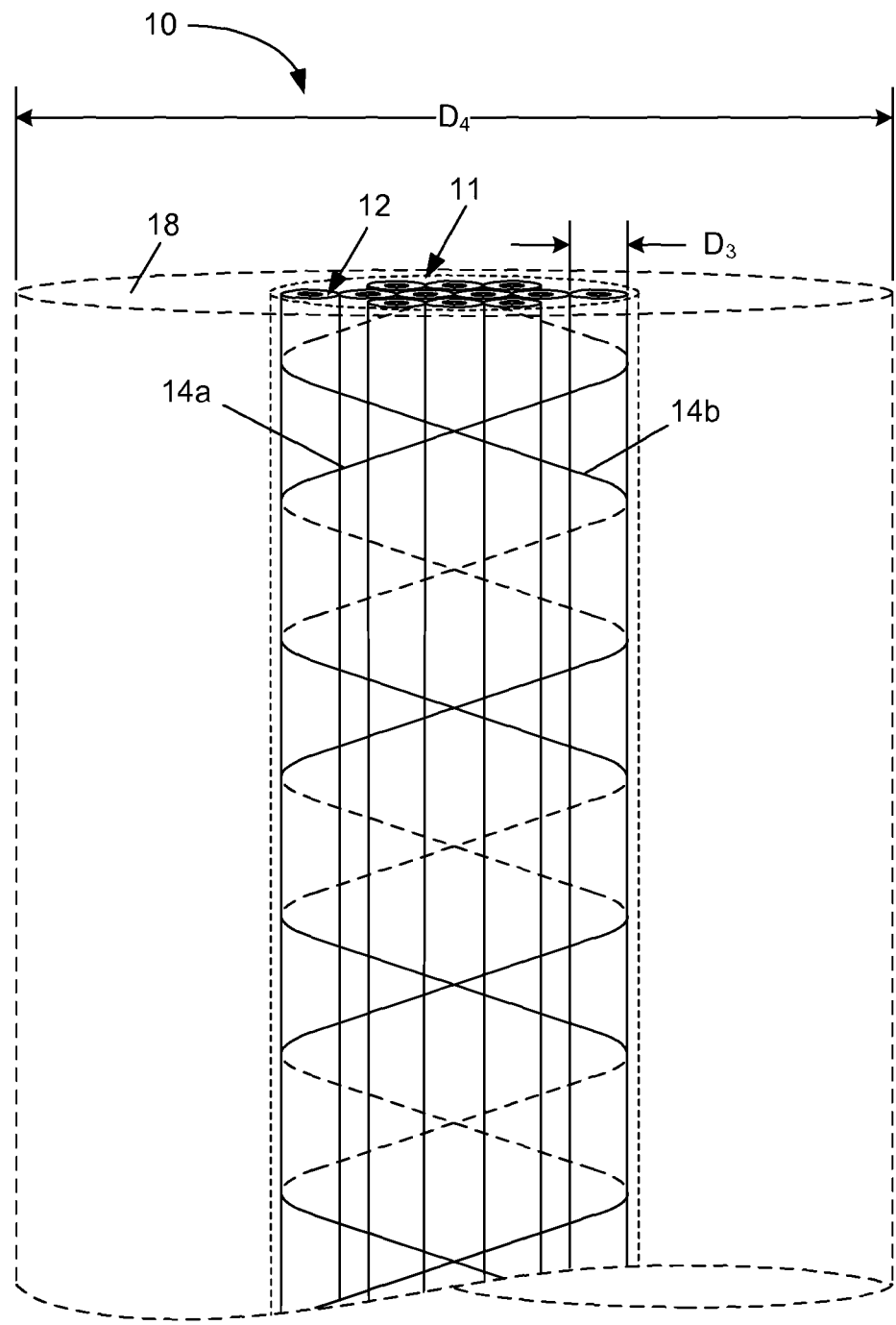
FIG. 1 is a perspective view of a multi-fiber cable assembly having exemplary features of aspects in accordance with the principles of the present disclosure.

Referring now to FIG. 1, a multi-fiber cable assembly, generally designated 10, is shown. The multi-fiber cable assembly 10 includes a fiber bundle, generally designated 11, having a plurality of optical fibers, generally designated 12. The multi-fiber cable assembly 10 further includes at least two fiber grouping members 14, a strength layer 16, and an outer jacket 18. In the subject embodiment, and by way of example only, the fiber bundle 11 is a single grouping of twelve optical fibers 12 disposed in the multi-fiber cable assembly 10. The plurality of optical fibers 12 is held in the fiber bundle 11 by the fiber grouping members 14, which will be described in greater detail subsequently.

Figure 2:
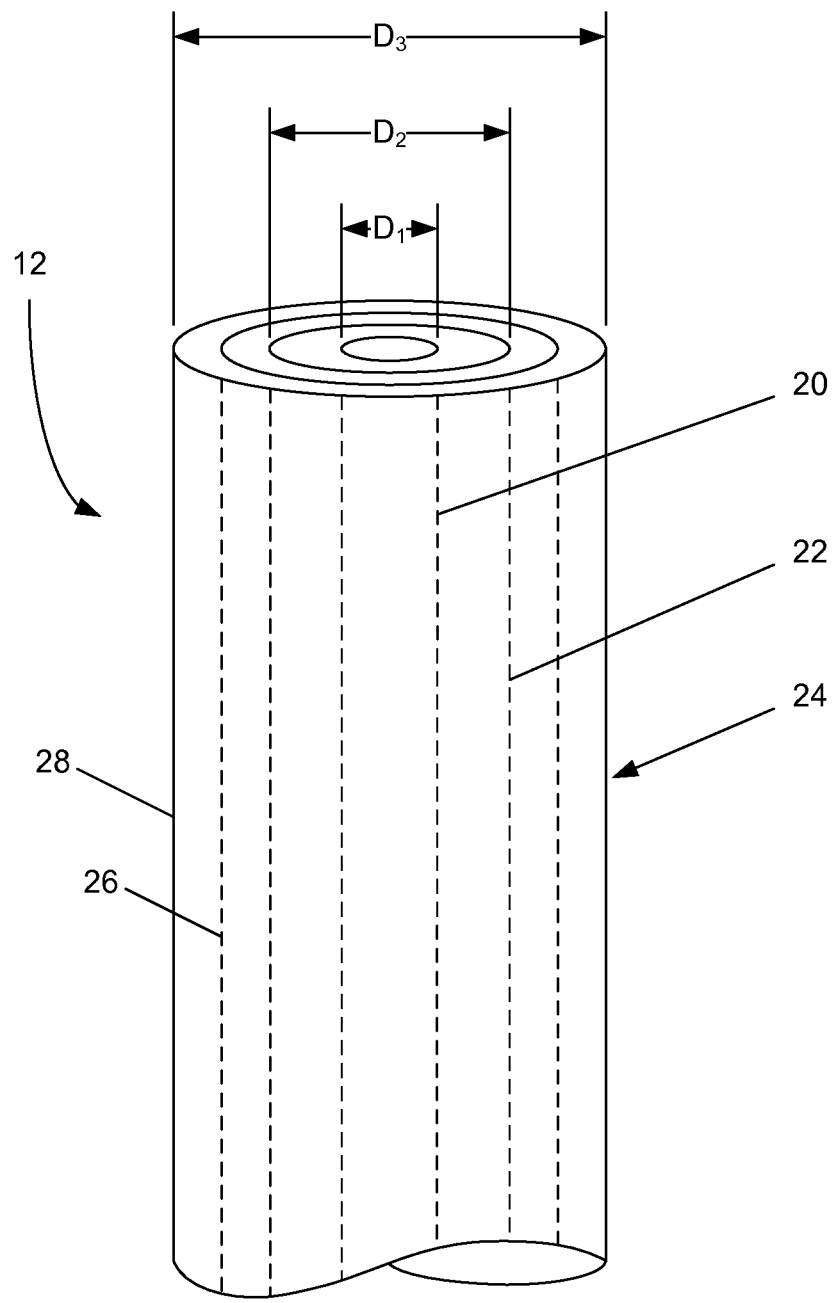
FIG. 2 is a perspective view of an optical fiber suitable for use in the multi-fiber cable assembly of FIG. 1.

Referring now to FIG. 2, one of the plurality optical fibers 12 is shown. Each optical fiber 12 includes a core 20. The core 20 is made of a glass material, such as a silica-based material, having a first index of refraction. In the subject embodiment, the core 20 has an outer diameter $D_1$ of less than or equal to about 10 µm.

The core 20 of each optical fiber 12 is surrounded by a cladding 22 that is also made of a glass material, such as a silica based-material. The cladding 22 defines a second index of refraction that is less than the first index of refraction defined by the core 20. This difference between the first index of refraction of the core 20 and the second index of refraction of the cladding 22 allows an optical signal that is transmitted through the optical fiber 12 to be confined to the core 20. In the subject embodiment, the cladding 22 has an outer diameter $D_2$ of less than or equal to about 125 µm.

A coating, generally designated 24, surrounds the cladding 22. The coating 24 includes an inner layer 26 and an outer layer 28. In the subject embodiment, the inner layer 26 of the coating 24 is immediately adjacent to the cladding 22 such that the inner layer 26 surrounds the cladding 22. The inner layer 26 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 26 functions to protect the optical fiber 12 from microbending.

The outer layer 28 of the coating 24 is a polymeric material having a higher modulus of elasticity than the inner layer 26. In the subject embodiment, the outer layer 28 of the coating 24 is immediately adjacent to the inner layer 26 such that the outer layer 28 surrounds the inner layer 26. The higher modulus of elasticity of the outer layer 28 functions to mechanically protect and retain the shape of optical fiber 12 during handling. In the subject embodiment, the outer layer 28 defines an outer diameter $D_3$ of less than or equal to 250 µm.

In the subject embodiment, the optical fiber 12 is manufactured to reduce the sensitivity of the optical fiber 12 to micro or macro-bending (hereinafter referred to as "bend insensitive"). Exemplary bend insensitive optical fibers 12 have been described in U.S. Pat. Application Publication Nos. 2007/0127878 and 2007/0280615 and are hereby incorporated by reference in their entirety. An exemplary bend insensitive optical fiber 12 suitable for use in the multi-fiber cable 10 of the present disclosure is commercially available from Draka Comteq under the name BendBright XS.

Referring again to FIG. 1, the plurality of optical fibers 12 are grouped together in the fiber bundle 11 and concentrically disposed within the outer jacket 18 of the multi-fiber cable assembly 10. The fiber grouping members 14 of the multi-fiber cable assembly 10 are disposed about the plurality of optical fibers 12. The fiber grouping members 14 group the optical fibers 12 together in the fiber bundle 11 and retains the optical fibers 12 in that grouping.

The fiber grouping members 14 are arranged about the plurality of optical fibers 12 in a generally reverse double helical configuration along the length of the optical fibers 12. This reverse double helical configuration of the fiber grouping members 14 about the plurality of optical fibers 12 secures the optical fibers 12 together during manufacturing of multi-fiber cable assembly 10. In the subject embodiment, the fiber grouping members 14 are strands of material, where the material can be, but is not limited to, cotton string.

In the subject embodiment, the fiber grouping members 14 include a first fiber grouping member 14a and a second fiber grouping member 14b. The first and second fiber grouping members 14a, 14b are arranged immediately about the plurality of optical fibers 12 in a generally reverse double helical configuration along the length of the optical fibers 12. With the first and second fiber grouping members 14a, 14b disposed immediately about the plurality of optical fibers 12, there is no intermediate layer disposed between the first and second fiber grouping members 14a, 14b and the plurality of optical fibers 12.

In the reverse double helical configuration, the first fiber grouping member 14a spirals about the length of the optical fibers 12 in a first direction while the second fiber grouping member 14b spirals about the length of the optical fibers 12 in a second direction, which is opposite from the first direction. In the subject embodiment, the first direction is a clockwise direction and the second direction is a counterclockwise direction. This reverse double helical arrangement of the first and second fiber grouping members 14a, 14b about the plurality of optical fibers 12 groups and retains the plurality of optical fibers in the fiber bundle 11.

The strength layer 16 of the multi-fiber cable assembly 10 is adapted to inhibit axial tensile loading from being applied to the optical fibers 12. The strength layer 16 can include yarns, fibers, threads, tapes, films, epoxies, filaments, or other structures. In one embodiment, the strength layer 16 includes aramid yarns (e.g., Kevlar® yarns) that extend lengthwise along the entire length of the cable. The strength layer 16 surrounds the fiber bundle 11 having the plurality of optical fibers 12 and the fiber grouping members 14 such that the strength layer 16 is immediately adjacent to the fiber grouping members 14. While there may be a space or gap between the strength layer 16 and the fiber grouping members 14, there is no intermediate layer (i.e., buffer layer) or coating disposed between the strength layer 16 and the fiber grouping members 14.

While the multi-fiber cable assembly 10 does not include an intermediate layer (i.e. a buffer layer) disposed between the strength layer 16 and the first and second fiber grouping members 14a, 14b, the at least two fiber grouping members 14 and the bend insensitive optical fibers 12 cooperate to bundle the plurality of optical fibers 12 together for manufacturing purposes and to protect the optical fibers 12 from attenuation losses caused by micro and macrobending of the multi-fiber cable assembly 10.

The outer jacket 18 of the multi-fiber cable assembly 10 surrounds the strength layer 16 such that the outer jacket 18 is immediately adjacent to the strength layer 16. The outer jacket 18 includes a base material 30 that is a thermoplastic material. In one embodiment, the base material 30 is a low-smoke zero halogen material such as low-smoke zero halogen polyolefin and polycarbonate. In another embodiment, the base material 30 is a conventional thermoplastic material such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other thermoplastic materials.

In the subject embodiment, the outer jacket 18 has an outer diameter $D_4$ that is less than or equal to about 4 mm. In another embodiment, the outer jacket 18 has an outer diameter $D_4$ that is less than or equal to 3.5 mm, that is less than or equal to about 3 mm. In another embodiment, the outer jacket 18 has an outer diameter $D_4$ that is in the range of about 2 mm to about 4 mm, about 2.5 mm to about 4 mm, about 3 mm to about 4 mm.

Figure 3:
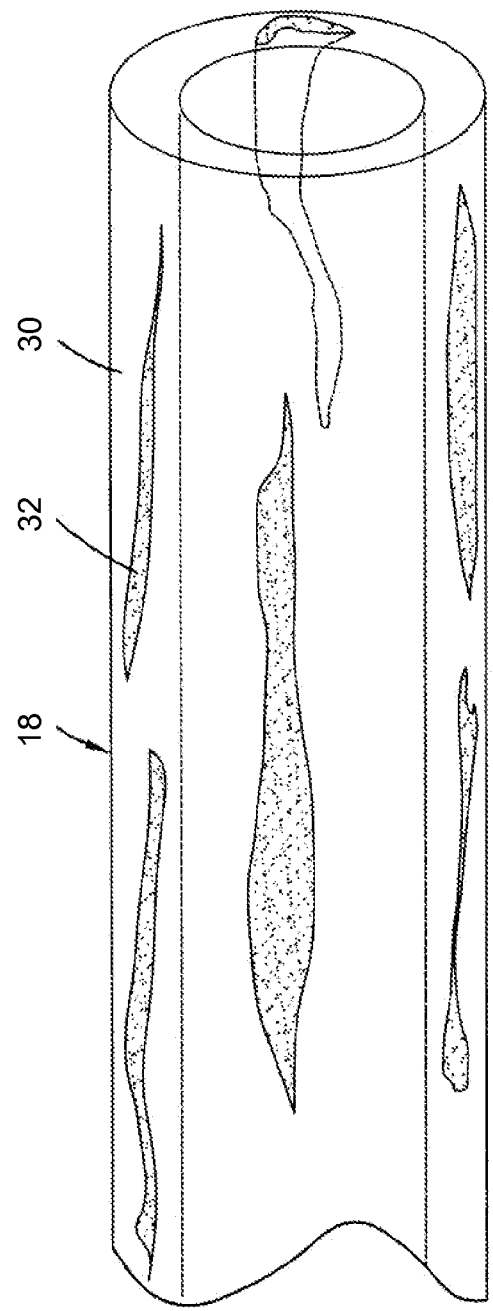
FIG. 3 is a perspective view of an outer jacket suitable for use with the multi-fiber cable assembly of FIG. 1.

Referring now to FIG. 3, an embodiment of the outer jacket 18 is shown in which the outer jacket 18 includes a plurality of shrinkage reduction material 32 disposed in the base material 30. The shrinkage reduction material 32 in the base material 30 of the outer jacket 18 is adapted to resist post-extrusion shrinkage. U.S. patent application Ser. No. 11/039,122 describes an exemplary use of shrinkage reduction material in the base material of the outer jacket and is hereby incorporated by reference in its entirety.

In one embodiment, the shrinkage reduction material 32 is liquid crystal polymer (LCP). Examples of liquid crystal polymers suitable for use in the multi-fiber cable assembly 10 are described in U.S. Pat. Nos. 3,991,014; 4,067,852; 4,083,829; 4,130,545; 4,161,470; 4,318,842; and 4,468,364 and are hereby incorporated by reference in their entireties.

In order to promote flexibility in the multi-fiber cable assembly 10, the concentration of shrinkage reduction material 32 is relatively small as compared to the base material 30. In one embodiment, and by way of example only, the shrinkage reduction material 32 constitutes less than about 10% of the total weight of the outer jacket 18. In another embodiment, and by way of example only, the shrinkage reduction material 32 constitutes less than about 5% of the total weight of the outer jacket 18. In another embodiment, the shrinkage reduction material 32 constitutes less than about 2% of the total weight of the outer jacket 18. In another embodiment, the shrinkage reduction material 32 constitutes less than about 1.9%, less than about 1.8%, less than about 1.7%, less than about 1.6%, less than about 1.5%, less than about 1.4%, less than about 1.3%, less than about 1.2%, less than about 1.1%, or less than about 1% of the total weight of the outer jacket 18.

Figure 4:
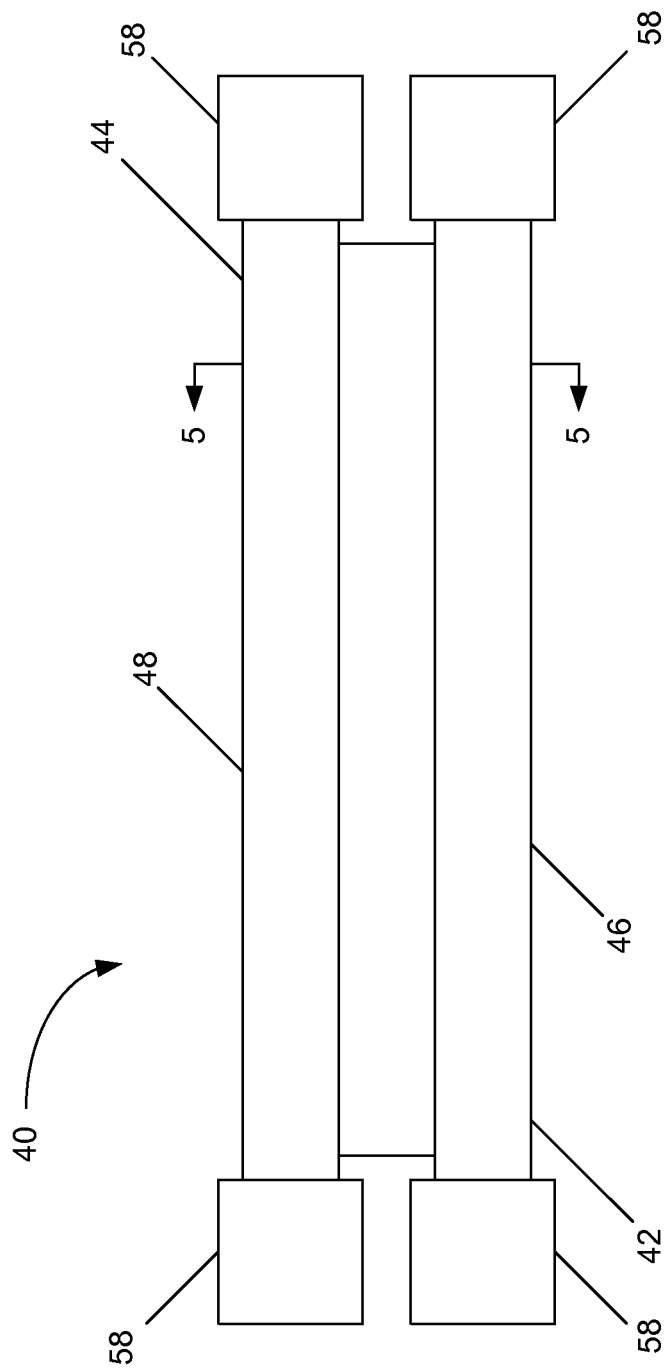
FIG. 4 is a top view of a dual cable assembly having exemplary features of aspects in accordance with the principles of the present disclosure.
Figure 5:
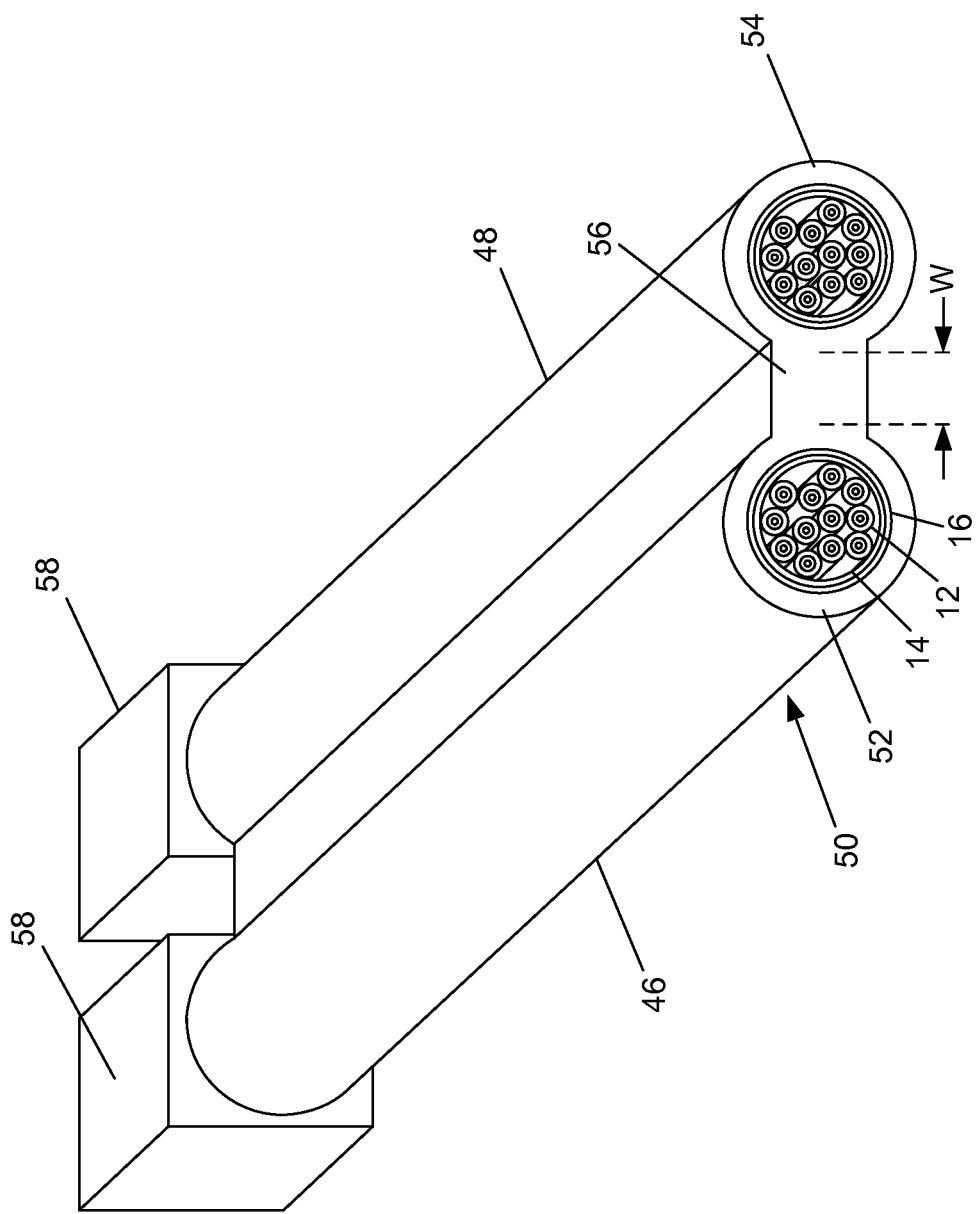
FIG. 5 is a cross-sectional view through the dual cable assembly taken at line 5-5 of FIG. 4.

Referring now to FIGS. 4 and 5, a dual cable assembly, generally designated 40 is shown. In the subject embodiment, the dual cable assembly 40 includes a first end 42 and an oppositely disposed second end 44.

The dual cable assembly 40 includes a first multi-fiber cable assembly 46 and a second multi-fiber cable assembly 48. Each of the first and second multi-fiber cable assemblies 46, 48 includes the plurality of optical fibers 12, the at least two fiber grouping members 14 and the strength layer 16.

The optical fibers 12, the fiber grouping members 14, and the strength layer 16 of first and second multi-fiber cable assemblies 42, 44 are surrounded by an outer jacket 50. The outer jacket 50 includes a first portion 52 that surrounds the first multi-fiber cable assembly 46 and a second portion 54 that surrounds the second multi-fiber cable assembly 48. In the subject embodiment, the outer jacket 50 further includes a web 56 that connects the first portion 52 of the outer jacket 50 to the second portion 54.

In the depicted embodiment, the web 56 of the outer jacket 50 separates the first and second multi-fiber cable assemblies 46, 48 by a distance W. The web 56 is thinner than the outer diameter of the first or second portion 52, 54 of the outer jacket 50. The thinness of the web 56 facilitates separating the first and second multi-fiber cable assemblies 42, 44 by either tearing or cutting.

In the subject embodiment, each of the first and second ends 42, 44 of the first and second multi-fiber cable assemblies 46, 48 includes a plurality of multi-fiber connectors 58. Exemplary multi-fiber connectors 58 are provided in U.S. Pat. No. 5,214,730, which is hereby incorporated by reference.

In the subject embodiment, at least one multi-fiber connector 58 is secured to each of the first and second ends 42, 44 of the first and second multi-fiber cable assemblies 46, 48. The strength members 16 at each end of the first and second multi-fiber cable assemblies 46, 48 are secured to multi-fiber connectors 58. In one embodiment, the strength members 16 are crimped onto the strength members 16.

Figure 6:
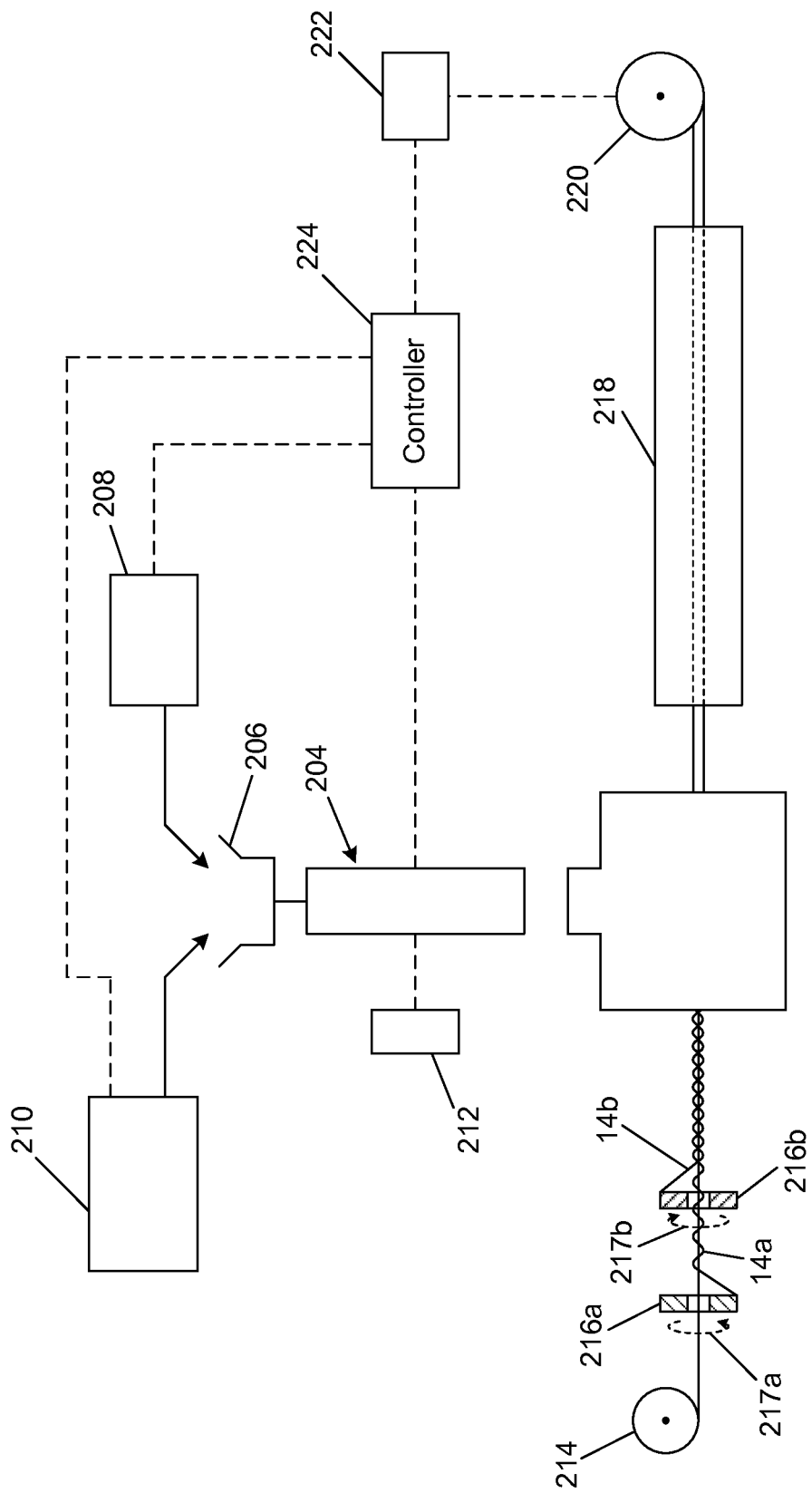
FIG. 6 is a schematic representation of an alternate system for manufacturing telecommunications cable in accordance with the principles of the present disclosure.

Referring now to FIG. 6, a schematic representation of a system 200 for making the multi-fiber cable assembly 10 is shown. The system 200 includes a crosshead, generally designated 202, that receives thermoplastic material from an extruder 204. A hopper 206 is used to feed materials into the extruder 204. A first conveyor 208 conveys the base material 30 to the hopper 206. A second conveyor 210 conveys the shrinkage reduction material 32 to the hopper 206. The extruder 204 is heated by a heating system 212 that may include one or more heating elements for heating zones of the extruder 204 as well as the crosshead 202 to desired processing temperatures. The plurality of optical fibers 12 is fed into the crosshead 202 from a feed roll 214.

The first and second fiber grouping members 14a, 14b are disposed on first and second supply rolls 216a, 216b (shown with cross-hatching in FIG. 6), respectively. The first supply roll 216a includes the first fiber grouping member 14a while the second supply roll 216b includes the second fiber grouping member 14b. In the subject embodiment, the plurality of optical fibers 12 passes through a center of the first supply roll 216a. As the plurality of optical fibers 12 passes through the center of the first supply roll 216a, the first supply roll 216a remains stationary. The first fiber grouping member 14a, however, is unwound from the stationary first supply roll 216a in a first direction 217a (shown as a dashed arrow in FIG. 6) such that the fiber first grouping member 14a is disposed in a generally helical configuration about the plurality of optical fibers 12. In the subject embodiment, the first direction 217a is a clockwise direction.

In the subject embodiment, the plurality of optical fibers 12 and the first grouping member 14a then pass through a center of the second supply roll 216b. As the plurality of optical fibers 12 and the first fiber grouping member 14a pass through the center of the second supply roll 216b, the second supply roll 216b remains stationary. The second grouping member 14b, however, is unwound from the stationary second supply roll 216b in a second direction 217b (shown as a dashed arrow in FIG. 6). In the subject embodiment, the second direction is opposite of the first direction. In the subject embodiment, the second direction 217b is a counterclockwise direction. In the subject embodiment, the first and second fiber grouping members 14a, 14b are oriented about the plurality of optical fibers 12 in a generally reverse double helical configuration.

A water trough 218 is located downstream from the crosshead 202 for cooling the extruded product that exits the crosshead 202. The cooled final product is stored on a take-up roll 220 rotated by a drive mechanism 222. A controller 224 coordinates the operation of the various components of the system 200.

In use of the system 200, the base material 30 and the shrinkage reduction material 32 are delivered to the hopper 206 by the first and second conveyors 208, 210, respectively. The controller 224 preferably controls the proportions of the base material 30 and the shrinkage reduction material 32 delivered to the hopper 206. In one embodiment, the shrinkage reduction material 32 constitutes less than 2% by weight of the total material delivered to the hopper 106. In other embodiments, the shrinkage reduction material 32 constitutes less than about 1.4% by weight.

From the hopper 206, the material moves by gravity into the extruder 204. In the extruder 204, the material is mixed, masticated, and heated. In one embodiment, the material is heated to a temperature greater than the melting temperature of the base material 30, but less than the melting temperature of the shrinkage reduction material 32. The temperature is preferably sufficiently high to soften the shrinkage reduction material 32 such that the shrinkage reduction material 32 is workable and extrudable. The extruder 204 is heated by the heating system 212. The extruder 204 also functions to convey the material to the crosshead 202, and to provide pressure for forcing the material through the crosshead 202.

Figure 7:
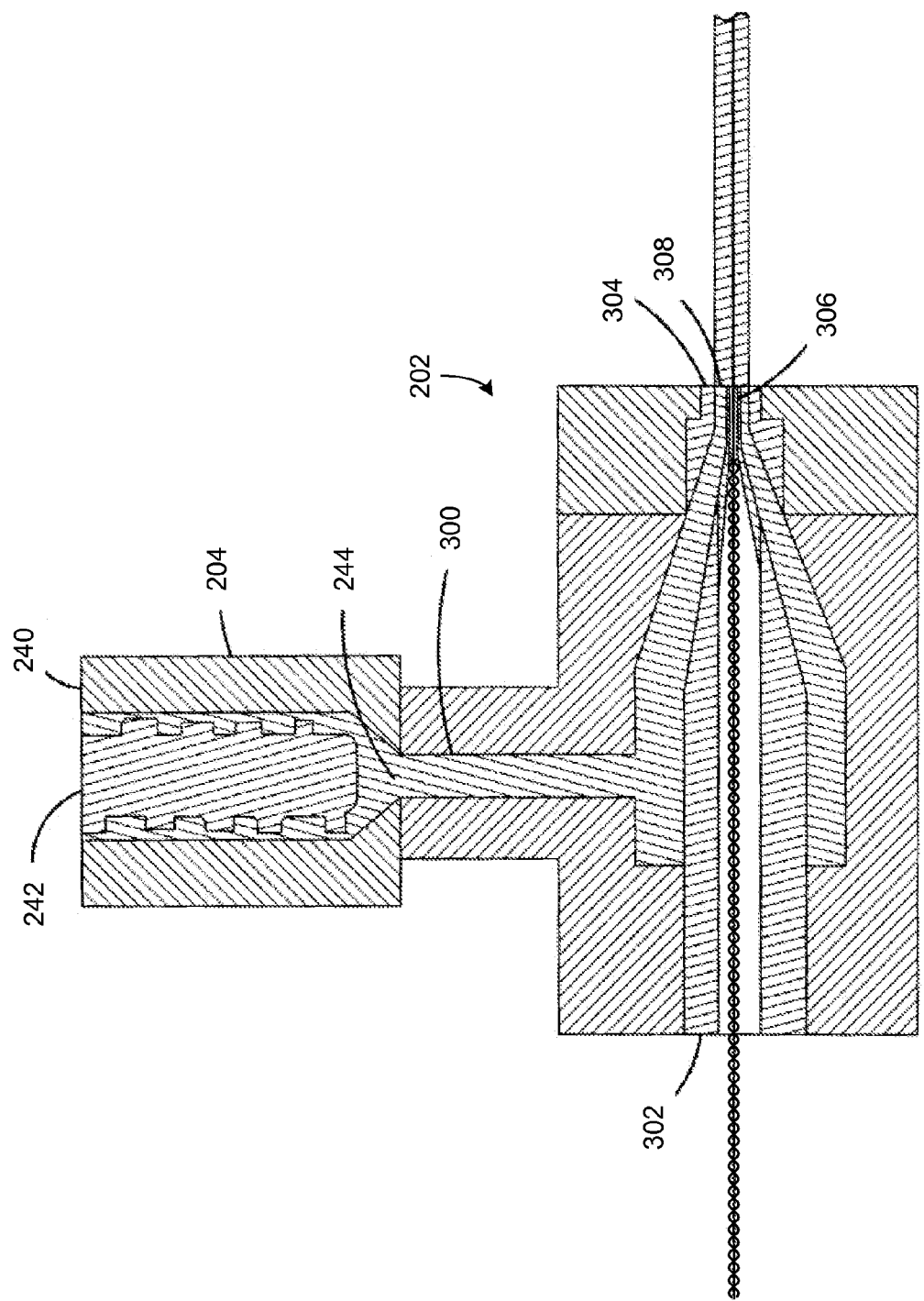
FIG. 7 is a cross-section view of a crosshead suitable for use with the system of FIG. 6.

Referring now to FIG. 7, the extruder 204 is depicted as including an extruder barrel 240 and an auger/style extruder screw 242 positioned within the extruder barrel 240. An extruder screen 244 can be provided at the exit end of the extruder 204. The extruder screen 244 prevents pieces too large for extrusion from passing from the extruder into the crosshead 202.

The crosshead 202 includes a jacket material input location 300 that receives thermoplastic material from the extruder 204. The crosshead 202 also includes a tip 302 and a die 304. The tip 302 defines an inner passageway 306 through which the plurality of optical fibers 12 and the at least one fiber grouping member 14 are fed. The die 304 defines an annular extrusion passage 308 that surrounds the exterior of the tip 302. The crosshead 202 defines an annular passageway for feeding the thermoplastic material to the annular extrusion passage 308. Within the crosshead 202, the flow direction of the thermoplastic material turns 90 degrees relative to the flow direction of the extruder 204 to align with the bundled fiber.

Within the crosshead 202, the material provided by the extruder 204 is preferably maintained at a temperature greater than the melt temperature of the base material 30, but less than the melt temperature of the shrinkage reduction material 32. As the thermoplastic material is extruded through the annular extrusion passage 308, the base material 30 and the shrinkage reduction material 32 are stretched. This stretching causes reshaping of the shrinkage reduction material 32 into elongated fibers 32 having lengths generally aligned with the longitudinal axis of the multi-fiber cable assembly 10. The extruded multi-fiber cable assembly 10 is then cooled and shape set at the water trough 218. The extrusion process can be a pressure or semi-pressure extrusion process where product leaves the crosshead 202 at the desired shape, or an annular extrusion process where the product is drawn down after extrusion. After cooling, the product is collected on the take-up roller 220.

What is claimed is:

1. A multi-fiber cable assembly comprising:
   a fiber bundle including a plurality of optical fibers, each optical fiber including a core, a cladding surrounding the core, and a coating surrounding the cladding;
   a first fiber grouping member disposed immediately about the plurality of optical fibers in a generally helical configuration along the length of the optical fibers;
   a second fiber grouping member disposed about the plurality of optical fibers, wherein the first and second fiber grouping members are configured about the plurality of optical fibers in a generally reverse double helical configuration so that there is no intermediate layer disposed between the first and second fiber grouping members and the plurality of optical fibers;
a strength layer surrounding both of the fiber grouping members; and
an outer jacket surrounding the strength layer, wherein the fiber bundle is concentrically disposed within the outer jacket.

2. A multi-fiber cable assembly as claimed in claim 1, wherein each of the plurality of optical fibers is a bend insensitive optical fiber.

3. A multi-fiber cable assembly as claimed in claim 1, wherein the fiber bundle includes twelve optical fibers.

4. A multi-fiber cable assembly as claimed in claim 1, wherein an outer diameter of the coating is less than or equal to about 250 μm.

5. A multi-fiber cable assembly as claimed in claim 4, wherein an outer diameter of the outer jacket is less than or equal to about 3 mm.

6. A multi-fiber cable assembly as claimed in claim 1, wherein the outer jacket is a thermoplastic material mixture having a base material and a shrinkage reduction material with the shrinkage reduction material being less than or equal to about 2% by weight of the thermoplastic material mixture.

7. A multi-fiber cable assembly as claimed in claim 6, wherein base material is low-smoke zero halogen material.

8. A multi-fiber cable assembly as claimed in claim 7, wherein the shrinkage reduction material is liquid crystal polymer.

9. A multi-fiber cable assembly as claimed in claim 8, wherein the shrinkage reduction material is less than or equal to about 1.4% by weight of the thermoplastic material mixture.

10. A multi-fiber cable assembly as claimed in claim 1, wherein each of the first and second fiber grouping members is a strand of material.

11. A multi-fiber cable assembly as claimed in claim 10, wherein the strand of material is cotton string.

12. A dual cable assembly comprising:
a first multi-fiber cable assembly having:
a first plurality of optical fibers, each of the first plurality of optical fibers including a core, a cladding surrounding the core, and a coating surrounding the cladding;
a first plurality of fiber grouping members disposed immediately about the plurality of optical fibers in a generally reverse double helical configuration along the length of the first plurality of optical fibers to form a first fiber bundle, wherein there is no intermediate layer disposed between the first plurality of fiber grouping members and the first plurality of optical fibers;
a first strength layer surrounding the first plurality of fiber grouping members;
a second multi-fiber cable assembly having:
a second plurality of optical fibers, each of the second plurality of optical fibers including a core, a cladding surrounding the core, and a coating surrounding the cladding;
a second plurality of fiber grouping members disposed immediately about the second plurality of optical fibers in a generally reverse double helical configuration along the length of the second plurality of optical fibers to form a second fiber bundle, wherein there is no intermediate layer disposed between the second plurality of fiber grouping members and the second plurality of optical fibers;
a second strength layer surrounding the second plurality of fiber grouping members; and
an outer jacket having a first portion that surrounds the first multi-fiber cable assembly, a second portion that surrounds the second multi-fiber cable assembly and a web portion that connects the first and second portions, the first strength layer contacting the first plurality of grouping members and also contacting the first portion of the outer jacket, the first fiber bundle being centered and concentrically disposed within the first portion of the outer jacket, the second strength layer contacting the second plurality of grouping members and also contacting the second portion of the outer jacket, the second fiber bundle being centered and concentrically disposed within the second portion of the outer jacket.

13. A dual cable assembly as claimed in claim 12, wherein outer jacket includes a thermoplastic material mixture having a base material and a shrinkage reduction material, wherein the shrinkage reduction material is less than 1.4% by weight of the thermoplastic material mixture.

14. A dual cable assembly as claimed in claim 13, wherein the base material is low-smoke zero halogen material.

15. A dual cable assembly as claimed in claim 12, wherein each of the first and second plurality of optical fibers is a plurality of bend insensitive optical fibers.

16. A dual cable assembly as claimed in claim 15, wherein the first and second pluralities of fiber grouping members are cotton string.

17. A method for manufacturing a multi-fiber cable assembly comprising:
providing a fiber bundle including a plurality of optical fibers, each optical fiber including a core, a cladding surrounding the core, and a coating surrounding the cladding;
mixing a base material in an extruder;
unwinding a first fiber grouping member in a first direction about the plurality of optical fibers such that the first fiber grouping member is oriented about the plurality of optical fibers in a generally helical configuration;
unwinding a second fiber grouping member in a second direction about the plurality of optical fibers where the second direction is opposite the first direction such that the first and second fiber grouping members are oriented in a reverse double helical configuration so that there is no intermediate layer disposed between the first and second fiber grouping members and the plurality of optical fibers;
feeding the plurality of optical fibers and the first and second fiber grouping members through a passageway;
feeding strength members through the passageway with portions of the strength members contacting the first and second grouping members; and
extruding the base material through an extrusion die to form an outer jacket that surrounds and contacts the strength members, wherein the fiber bundle is concentrically disposed within the outer jacket.

18. A method for manufacturing a multi-fiber cable assembly as claimed in claim 17, wherein the first and second fiber grouping members are cotton string.

19. A method for manufacturing a multi-fiber cable assembly as claimed in claim 18, wherein each of the plurality of optical fibers is a bend insensitive optical fiber.

* * * * *

UNITED STATES PATENT AND TRADEMARK OFFICE
CERTIFICATE OF CORRECTION

| | | |
|---|---|---|
| PATENT NO. | : 8,422,843 B2 | Page 1 of 1 |
| APPLICATION NO. | : 12/411756 | |
| DATED | : April 16, 2013 | |
| INVENTOR(S) | : Kachmar | |

It is certified that error appears in the above-identified patent and that said Letters Patent is hereby corrected as shown below:

In the Specification

Col. 3, line 36: "yams, fibers, threads," should read --yarns, fibers, threads,--

Col. 3, line 38: "aramid yams (e.g., Kevlar® yams) that extend" should read --aramid yarns (e.g., Kevlar® yarns) that extend--

Signed and Sealed this
Fourth Day of March, 2014

Michelle K. Lee
*Deputy Director of the United States Patent and Trademark Office*